Patented Feb. 8, 1944

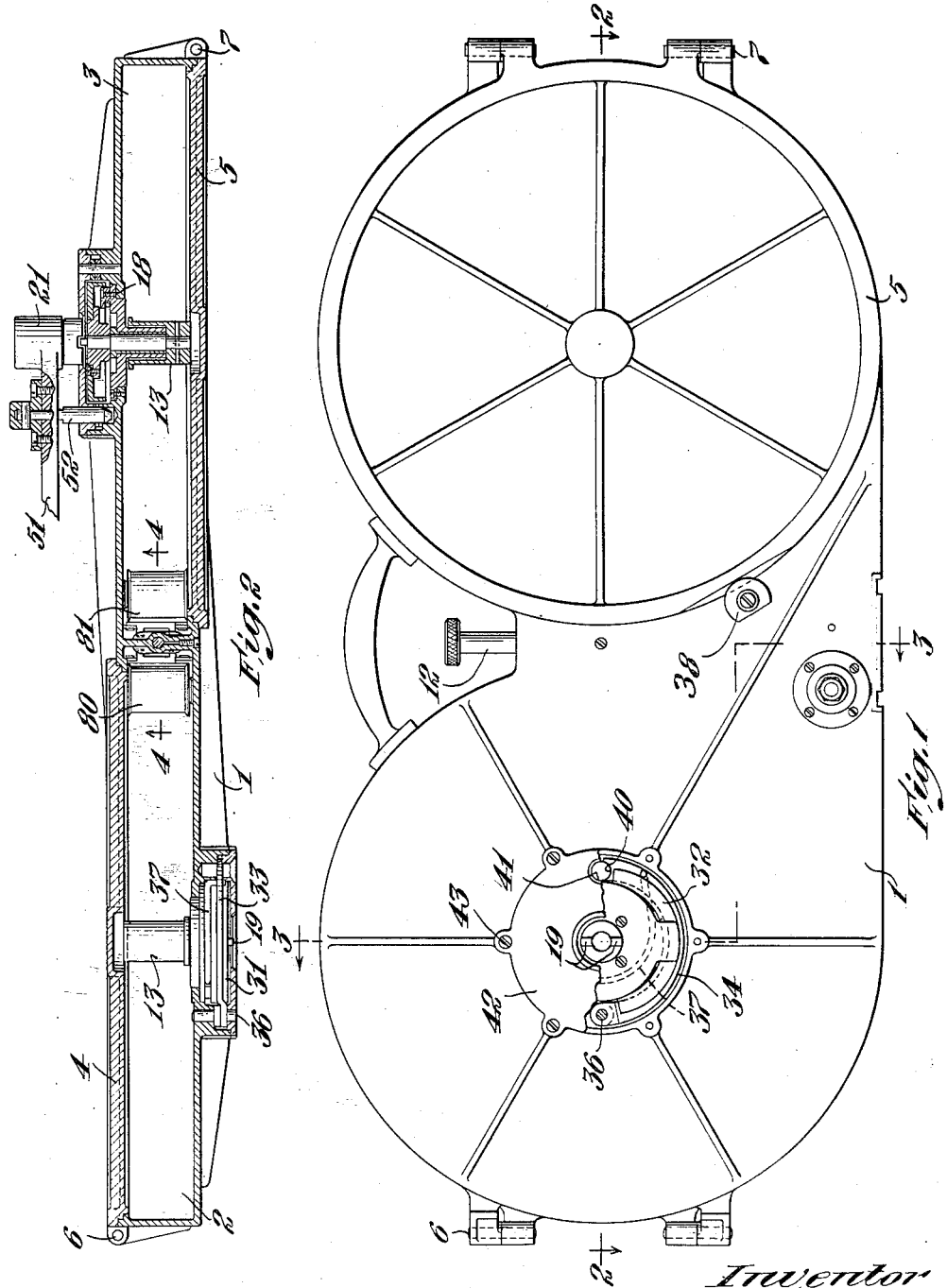

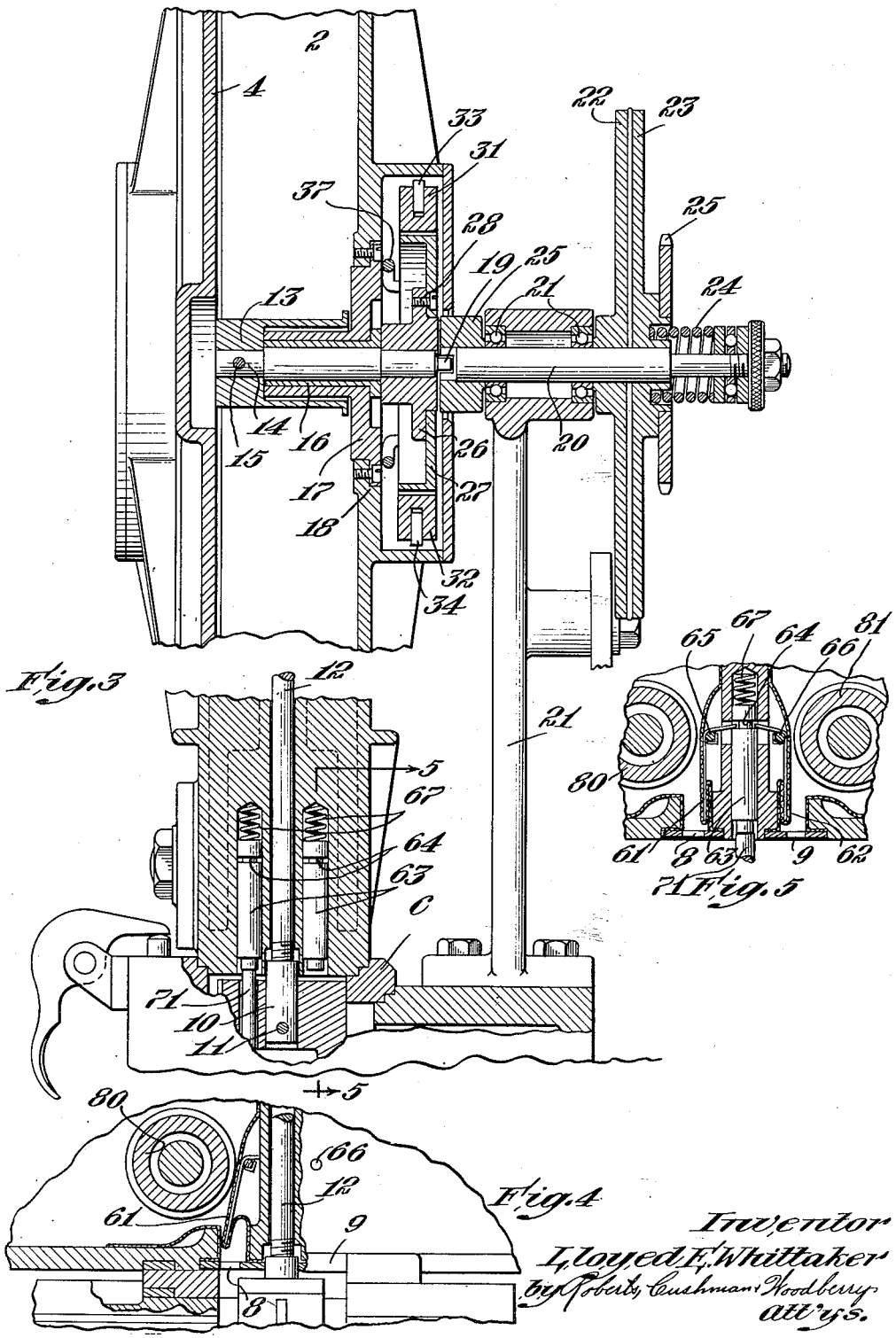

2,341,402

UNITED STATES PATENT OFFICE 2,341,402

REVERSIBLE MAGAZINE CINEMATOGRAPHIC APPARATUS

Lloyed E. Whittaker, Los Angeles, Calif., assignor to Technicolor Motion Picture Corporation, Hollywood, Calif., a corporation of Maine Application August 21, 1942, Serial No. 455,594

8 Claims. (Cl. 88—17)

In the art of cinematography it is customary to provide cameras, and sometimes other motion picture machines, with film magazines having two spindles for supply and take-up reels and having means for mounting the magazines on the machine so that film may feed from one reel through the machine and thence back to the other reel in the magazine. It is also customary to provide the supply reel with a brake so that it does not overrun while the film is being fed therefrom. It is also common practice to provide light traps for the openings in the magazine through which film feeds to and from the magazine, the traps being closed automatically when the magazine is mounted on the camera.

Objects of the present invention are to provide a reversible magazine to which either spindle may be used for the take-up reel, in which the other spindle is automatically braked, in which the light traps may be operated automatically in each position, in which the magazine is placed on the camera, and which may be operated with equal facility in either position in which it is placed on the camera.

According to the present invention means are provided for reversibly mounting the magazine on the camera or other motion picture machine so that either spindle of the magazine may drive the take-up reel while the other spindle supports the supply reel, together with means for automatically braking whichever spindle supports the supply reel without braking the other spindle, the latter means including a part on the machine which is automatically brought into operative relationship with one or the other of the spindles depending upon the one or the other of its two positions in which the magazine is mounted on the machine. Preferably the brake means comprises a brake for each spindle and means on the camera for releasing the brake on the spindle which drives the supply reel.

In a more specific aspect the invention involves means for automatically opening the aforesaid light traps when the magazine is mounted in either of its two positions, the means including two operators on the magazine for each opening and two actuators on the machine, the operators and actuators being positioned so that an actuator engages one operator in one position of the magazine and the other actuator engages the other operator in the reverse position of the magazine.

For the purpose of illustration a typical embodiment of the invention is shown in the accompanying drawings, in which Fig. 1 is a side elevation of a magazine with parts broken away;

Fig. 2 is a section on line 2—2 of Fig. 1;

Fig. 3 is a vertical section through the magazine on the line 3—3 of Fig. 1, showing a part of a camera in operative relationship to the magazine;

Fig. 4 is a section on line 4—4 of Fig. 2, the right-hand portion of the figure being in elevation; and Fig. 5 is a section on line 5—5 of Fig. 3.

The particular embodiment of the invention chosen for the purpose of illustration comprises a casing 1 having two reel compartments 2 and 3. The compartments have doors 4 and 5 pivotally mounted at 6 and 7, each door having a latch 38 for holding it in closed position. As shown in Figs. 3 and 4 the magazine seats in a recess in the top of the camera C, the magazine having openings 8 and 9 through which film feeds to and from the magazine. The camera is provided with a threaded socket 10, held in place by a pin 11, and the magazine has a pin 12 extending down through a central vertical opening and threading into the socket for the purpose of holding the magazine tightly in place.

Each of the compartments 2 and 3 is provided with a central spindle 13 which is mounted on a shaft 14 by means of a pin 15. The shaft 14 is journaled in a bearing 16 mounted in the hub of a disc 17 which is mounted in an opening in the side of the casing by means of screws 18, the spindle being recessed to receive the aforesaid hub in spaced relation thereto. To the outer end of the shaft 14 is fast a sleeve 20 having tongues 19 adapted to fit into recesses in the end of a collar 25 fast to shaft 20 which is journaled on a camera bracket 21 through the medium of roller bearings 21. The outer end of the shaft 20 is provided with a friction clutch comprising two parts 22 and 23 pressed together by means of a spring 24, the disc 23 carrying a sprocket wheel 25 which may be connected to the motor of the camera through a sprocket chain.

To the sleeve 26 a brake drum 27 is secured by means of screws 28. Extending around the upper and lower sides of the drum 27 are two brake shoes 31 and 32 which have peripheral recesses in their outer sides to receive the two brake arms 33 and 34, these arms being pivotally mounted in the casing by means of a pin 36. For the purpose of pressing the brake shoes against the drum a C-shaped spring 37 has its hooked ends extending into recesses in the forward sides of the brake arms 33 and 34. Thus the brake may be released by pressing the free ends of the arms 33 and 34 apart. As shown in Fig. 1 the free ends of the arms are provided with semicircular recess 40 by which the brake may be released by inserting a circular pin through the opening 41 in the cover 42 which is fastened to the casing by means of screws 43.

Mounted on the arm 51 of the bracket 21 is a pin 52 adapted to project into the opening 41 when the magazine is mounted on the camera, thereby to release the brake on the associated spindle upon which the take-up reel is placed. In placing the magazine on the camera the magazine is set in the seat on the camera with its upper end tilted forward and then, as the upper end of the magazine is pushed back into vertical position, the pin 52 enters the hole 41 to release the associated brake.

The aforesaid openings 8 and 9 are provided with light traps 61 and 62 which occupy the position shown in Fig. 4 when closed and which open to the position shown in Fig. 5 when the magazine is placed on the camera. Slidably mounted in vertical bores in the central web of the magazine are two pins 63 having annular recesses 64. The light traps 61 and 62 are pivoted at 65 and 66 and are provided with tail pieces extending into both recesses 64. Thus when either pin 63 is pressed up against the action of its associated spring 67, the two light traps are swung to the open position shown in Fig. 5, and inasmuch as both pins are interconnected with the traps the other pin 63 is lifted by the traps as shown in Fig. 3. The camera is provided with a plunger 71 which engages one or the other of the two plungers 63 depending upon the position in which the magazine is placed on the camera. The plunger 71 may be connected with the door of the camera so that the light traps are closed when the door of the camera is opened, as well as when the magazine is removed from the camera. Adjacent the openings 8 and 9 are two guide rollers 80 and 81 for guiding the film to and from the openings.

From the foregoing it will be evident that when the magazine is placed on the camera in the position illustrated in the drawing the reel in compartment 2 serves as the supply reel and the reel in compartment 3 serves as the take-up reel, the brake on the supply reel being left in its normal operative position and the brake on the take-up reel being automatically released by the pin 52 as the magazine is applied to the camera.

Of the many uses for apparatus of this kind a typical example consists in exposing two rows of 16 mm. pictures on 35 mm. film in a camera having a 16 mm. aperture located off-center so that one row of 16 mm. pictures is exposed along one margin of the 35 mm. film while the film is run through the camera in one direction and another row is exposed along the other margin when the film is run in the reverse direction. According to the present invention the magazine need merely be reversed in position between the two runs.

It should be understood that the present disclosure is for the purpose of illustration only and that this invention includes all modifications and equivalents which fall within the scope of the appended claims.

I claim:

1. Cinematographic apparatus comprising a motion picture machine, a film magazine having two spindles for supply and take-up reels, means for reversibly mounting the magazine on the machine so that either spindle may drive the take-up reel while the other spindle supports the supply reel, and means for automatically braking whichever spindle supports the supply reel without braking the other spindle, said last means including a part on the machine which is automatically brought into operative relationship with one or the other of the spindles depending upon the one or the other of its two positions in which the magazine is mounted on the machine.

2. Cinematographic apparatus comprising a motion picture machine, a film magazine having two spindles for supply and take-up reels, means for reversibly mounting the magazine on the machine so that either spindle may drive the take-up reel while the other spindle supports the supply reel, and means for automatically braking whichever spindle supports the supply reel without braking the other spindle, said last means including a brake for each spindle and a part on the machine which is automatically brought into operative relationship with one or the other of the brakes depending upon the one or the other of its two positions in which the magazine is mounted on the machine.

3. Cinematographic apparatus comprising a motion picture machine, a film magazine having two spindles for supply and take-up reels, means for reversibly mounting the magazine on the machine so that either spindle may drive the take-up reel while the other spindle supports the supply reel, a brake for each spindle, and means for releasing the brake on the spindle which drives the supply reel, said last means including a part on the machine which is automatically brought into operative relationship with one or the other of the brakes depending upon the one or the other of its two positions in which the magazine is mounted on the machine.

4. Cinematographic apparatus comprising a motion picture machine, a film magazine having two spindles for supply and take-up reels, means for reversibly mounting the magazine on the machine so that either spindle may drive the take-up reel while the other spindle supports the supply reel, a brake for each spindle, and means for releasing the brake on the spindle which drives the supply reel, each brake comprising an arm movable back and forth between braking position and retracted position, and a spring for urging the brake toward braking position, and said last means including a part on the machine which is automatically brought into operative relationship with one or the other of the arms depending upon the one or the other of its two positions in which the magazine is mounted on the machine.

5. Cinematographic apparatus comprising a motion picture machine, a film magazine having two spindles for supply and take-up reels, means for reversibly mounting the magazine on the machine so that either spindle may drive the take-up reel while the other spindle supports the supply reel, a brake for each spindle comprising two arms pivoted at one side of the spindle and extending around opposite sides thereof, with their free ends in juxtaposition, brake surfaces carried by said arms, spring means for pressing said surfaces against a brake surface associated with the spindle, and control means including a part on the machine which is brought into operative relationship with one or the other of the brakes to separate said free ends depending upon the one or the other of its two positions in which the magazine is mounted on the machine.

6. Cinematographic apparatus comprising a motion picture machine, a film magazine having two spindles for supply and take-up reels, means for reversibly mounting the magazine on the machine so that either spindle may drive the take-up reel while the other spindle supports the supply reel, brake means for automatically braking whichever spindle supports the supply reel without braking the other spindle, said brake means including a part on the machine which is automatically brought into operative relationship with one or the other of the spindles depending upon the one or the other of its two positions in which the magazine is mounted on the machine, the machine and magazine having registering openings through which film feeds to and from the magazine, a movable light trap for the magazine opening, and control means for automatically opening the trap when the magazine is mounted on the machine, said control means including two operators on the magazine and an actuator on the machine, the operators and actuator being positioned so that the actuator engages one operator in one position of the magazine and engages the other operator in the reverse position of the magazine.

7. Cinematographic apparatus comprising a motion picture machine, a film magazine having two spindles for supply and take-up reels, means for reversibly mounting the magazine on the machine so that either spindle may drive the take-up reel while the other spindle supports the supply reel, the machine and magazine having registering openings through which film feeds to and from the magazine, a movable light trap for the magazine opening, and means for automatically opening the trap when the magazine is mounted on the machine, said last means including two operators on the magazine and an actuator on the machine, the operators and actuator being positioned so that the actuator engages one operator in one position of the magazine and engages the other operator in the reverse position of the magazine.

8. Cinematographic apparatus comprising a motion picture machine, a film magazine having two spindles for supply and take-up reels, means for reversibly mounting the magazine on the machine so that either spindle may drive the take-up reel while the other spindle supports the supply reel, the magazine having openings through which film feeds to and from the magazine, a movable light trap for each opening, and means for automatically opening the traps when the magazine is mounted on the machine, said last means including two operators on the magazine and an actuator on the machine, the operators and actuator being positioned so that the actuator engages one operator in one position of the magazine and engages the other operator in the reverse position of the magazine.

LLOYED E. WHITTAKER.